US009222567B2

(12) United States Patent
Tumback

(10) Patent No.: US 9,222,567 B2
(45) Date of Patent: Dec. 29, 2015

(54) ASYMMETRIC TOOTHING

(75) Inventor: Stefan Tumback, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 13/812,643

(22) PCT Filed: Jul. 22, 2011

(86) PCT No.: PCT/EP2011/062631
§ 371 (c)(1),
(2), (4) Date: Jan. 28, 2013

(87) PCT Pub. No.: WO2012/019897
PCT Pub. Date: Feb. 16, 2012

(65) Prior Publication Data
US 2013/0118283 A1 May 16, 2013

(30) Foreign Application Priority Data

Jul. 27, 2010 (DE) .......................... 10 2010 038 443

(51) Int. Cl.
F16H 55/08 (2006.01)
F02N 15/06 (2006.01)
B23P 15/14 (2006.01)
F02N 11/00 (2006.01)
F02N 11/08 (2006.01)

(52) U.S. Cl.
CPC ................ F16H 55/08 (2013.01); B23P 15/14 (2013.01); F02N 15/06 (2013.01); F16H 55/0873 (2013.01); F02N 11/00 (2013.01); F02N 11/0851 (2013.01); Y10T 29/49462 (2015.01); Y10T 74/19949 (2015.01)

(58) Field of Classification Search
CPC ......................... F16H 55/0873; F02N 11/0851
See application file for complete search history.

(56) References Cited

U.S. PATENT DOCUMENTS

| 1,329,535 | A |   | 2/1920  | McGrath              |
|-----------|---|---|---------|----------------------|
| 1,491,481 | A |   | 4/1924  | Huetter              |
| 4,223,528 | A | * | 9/1980  | Vuilleumier .......... 368/220 |
| 4,715,239 | A |   | 12/1987 | Giometti             |
| 4,744,263 | A | * | 5/1988  | Kuiken .................. 74/462 |
| 4,776,224 | A | * | 10/1988 | Maezawa et al. ....... 74/7 E |
| 4,890,504 | A | * | 1/1990  | Carrigan et al. ....... 74/458 |
| 4,911,032 | A | * | 3/1990  | Steele et al. .......... 74/462 |
| 5,035,151 | A |   | 7/1991  | Isozumi              |

(Continued)

FOREIGN PATENT DOCUMENTS

| CN | 102918257 | 2/2013 |
| DE | 256778    | 2/1913 |

(Continued)

OTHER PUBLICATIONS

International Search Report for Application No. PCT/EP2011/062631 dated Feb. 28, 2012 (English Translation and Original, 6 pages).

Primary Examiner — David M Fenstermacher
(74) Attorney, Agent, or Firm — Michael Best & Friedrich LLP

(57) ABSTRACT

The invention relates to a toothing, in particular between a starting pinion (22) and a ring gear (25) of an internal combustion engine. The toothing is designed as straight or oblique toothing and comprises a number of individual teeth (202) that mesh with one another. The thicknesses of the individual teeth (212) are asymmetrical, in particular in reduced or widened form on one or both sides.

27 Claims, 3 Drawing Sheets

(56) References Cited

U.S. PATENT DOCUMENTS

| | | | | |
|---|---|---|---|---|
| 5,083,474 | A | * | 1/1992 | Rouverol ................... 74/461 |
| 5,251,499 | A | | 10/1993 | Isozumi |
| 5,423,232 | A | * | 6/1995 | Miller et al. ............ 74/421 R |
| 6,178,840 | B1 | * | 1/2001 | Colbourne et al. .......... 74/462 |
| 6,203,439 | B1 | * | 3/2001 | Tychsen et al. ........... 464/156 |
| 6,276,226 | B1 | * | 8/2001 | Fujiwara ................... 74/462 |
| 8,201,471 | B2 | * | 6/2012 | Ohmi et al. ............... 74/462 |
| 8,944,519 | B2 | * | 2/2015 | Pietrala ................... 299/43 |
| 2008/0300097 | A1 | | 12/2008 | Tanabe et al. |

FOREIGN PATENT DOCUMENTS

| | | |
|---|---|---|
| DE | 441088 | 7/1927 |
| DE | 19844388 | 4/2000 |
| GB | 995092 | 6/1965 |
| GB | 1460934 | 1/1977 |
| JP | 2000170882 | 6/2000 |
| JP | 2001248710 | 9/2001 |
| JP | 2002130098 | 5/2002 |
| JP | 2002250428 | 9/2002 |
| WO | 2011/117055 | 9/2011 |

* cited by examiner

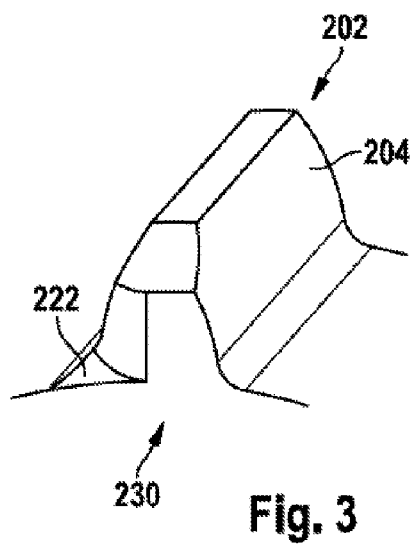
Fig. 3
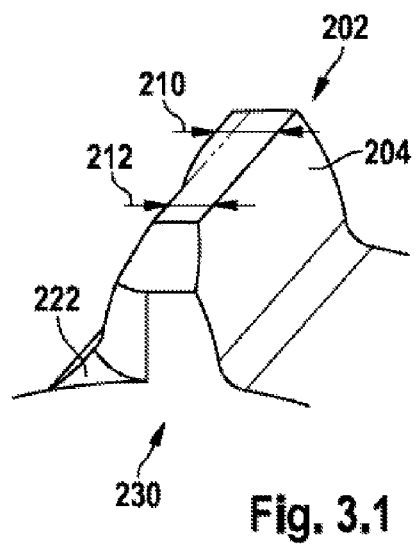
Fig. 3.1
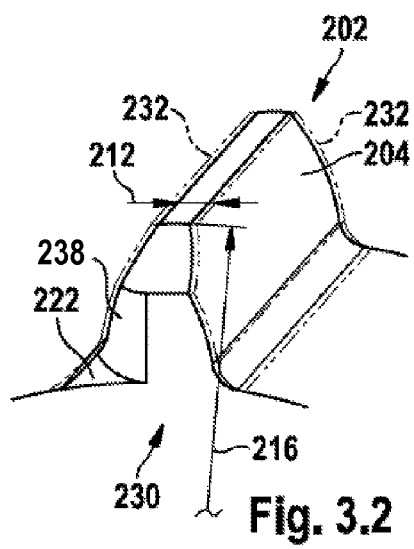
Fig. 3.2
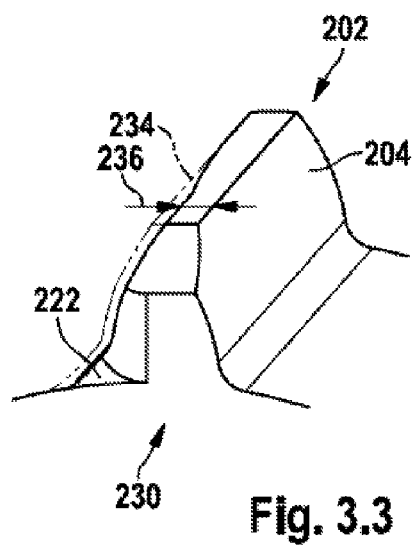
Fig. 3.3

ASYMMETRIC TOOTHING

BACKGROUND OF THE INVENTION

DE 37 30 939 A1 relates to an engine starter gearing. Said engine starter gearing serves for starting an engine with a starter gearwheel, wherein the engine starter gearing has a number of centrifugally acting flyweights. Said engine starter gearing serves for starting an engine with a starter gearwheel, wherein the engine starter gearing has a number of centrifugally acting flyweights. Said flyweights are located in an annular manner inside a circular recess of a clutch element, each of which has an oblique surface. Said oblique surface bears against a conical surface of a driven clutch element, wherein the flyweights act such that they axially displace the driving clutch element under the action of the centrifugal force.

A pinion is revealed from DE 37 30 939 A1, the individual teeth of said pinion having a tooth width which is shortened relative to the axial length of the pinion.

In conventional straight toothing or oblique toothing, for a gearwheel combination consisting of a starter pinion and a ring gear meshing with one another, the toothing is configured such that a torsional flank clearance of at least 0.3 mm is present between the starter pinion and the ring gear. The flank clearance is necessary in order to permit the meshing operation. The torsional flank clearance is the clearance which is measured between the meshed starter pinion and the ring gear of the internal combustion engine. A torsional flank clearance in the order of at least 0.3 mm, however, is a drawback for the silent operation of the toothings of the starter pinion and the ring gear meshing together, as the noise development of a toothing depends on the flank clearance of the toothings meshing together. This results in a technical difficulty, so that it is necessary to optimize the noise behavior of a toothing.

SUMMARY OF THE INVENTION

Pursuant to the proposed solution according to the invention it is proposed to form an asymmetrical toothing so that the noise level of toothings meshing together may be improved, without endangering or even impairing the reliable meshing of the starter pinion in the toothing of the ring gear. The asymmetrical toothing is in this case designed such that the tooth thickness, either of the starter pinion or the ring gear, is reduced over a region of the tooth width in the front region of the gearwheel—the asymmetry requires this. Within this front region of the toothing of the gearwheel or portion of the toothing of the gearwheels, the torsional flank clearance is, for example, 0.3 mm. As a result, the configuration of the toothing as an asymmetrical toothing permits the toothing over the remaining tooth width, in which the tooth thickness is not reduced, to be able to be configured with a markedly reduced flank clearance which is significantly below the torsional flank clearance of 0.3 mm. By configuring the asymmetrical toothing in the flank region of the gearwheel of the toothing, whether the outer toothing of the starter pinion or the outer toothing of the ring gear, combined with the markedly reduced flank clearance on the remaining region of the tooth width, the meshing of the starter pinion in the toothing of the ring gear is ensured, on the one hand, and the noise level of the toothing noticeably reduced, on the other hand.

Alternatively, in the proposed solution according to the invention, the same effect may be achieved by the tooth being widened in the rear region of the toothing. This has the advantage that the tooth is not weakened with regard to its thickness.

In both cases, care has to be taken to make a uniform transition between the regions in which different tooth widths are present. In an extreme case, the transition region may extend over the entire width of the toothing. The tooth thickness is altered in any case on the driven flank of the pinion, so that the driving flank of one respective individual tooth is able to distribute the load over the entire width of the toothing.

Care has to be taken in the configuration of the asymmetrical toothing proposed according to the invention that the flank pressure and the tooth root stresses occurring in the root circle of the individual teeth are maintained and not exceeded both in the region of reduced tooth thickness, i.e. in the front region of the toothing, and in the region which is configured with normal tooth thickness. The asymmetrical toothing proposed according to the invention has to be configured such that, on the one hand, the desired reduction of the torsional flank clearance is achieved and at the same time the meshing of the starter pinion in the toothing of the ring gear is reliably maintained with a torsional flank clearance of at least 0.3 mm.

In order to take into account these two boundary conditions, the toothing geometry has to be optimized by the stresses occurring in the tooth root and on the tooth flank being maintained, and the torsional flank clearance being minimized, based on the tolerances of the bearings of the gearwheels. Based on the optimized toothing geometry, a toothing geometry is derived which has a reduced tooth width in the front region, i.e. in the meshing region of the ring gear and starter pinion, with a required torsional flank clearance of 0.3 mm or more. In this case, the same tooth root radius may be used as in the case of the optimized toothing geometry. The tooth width may be reduced by setting a different profile modification factor on the starter pinion, for example, but the diameter of the tip circle of the toothing on the starter pinion does not have to be altered.

Provided the stresses occurring at the tooth root of the toothing geometry are at least the same as in a reference toothing, the optimized toothing geometry is permitted. If this is not the case, a modular increase has to be undertaken in the case of the optimized toothing geometry and the subsequent configuration steps have to be repeated.

In a further advantageous embodiment of the idea on which the invention is based, a front part of a pinion tooth may be provided with a set-back indentation. The tooth is accordingly markedly thinner along the length of said set-back indentation but, as before, has a running surface on the driven flank. This geometric variant simplifies the meshing process if the circumferential speed of the ring gear on the engine side is greater than that of the pinion on the starter side. This is advantageous, for example, in the case of meshing in an internal combustion engine which is decelerating.

The proposed embodiments according to the invention of an asymmetrical toothing may be configured both on the pinion on the starter side and on the ring gear on the engine side. It is also conceivable for individual features of the proposed solution according to the invention, thus for example the meshing angle, the indentation on the tooth as well as a tooth width which may be altered over the tooth length, to be distributed to the toothing pairs meshing with one another, i.e. to the pinion and to the ring gear toothing, so that individual features of the proposed solution according to the invention may be implemented on the pinion and others on the ring gear, or in a development of the proposed solution according to the invention individual features may be found on both toothing pairs meshing with one another, i.e. on the pinion and on the ring gear.

BRIEF DESCRIPTION OF THE DRAWINGS

The invention is described hereinafter in more detail with reference to the drawings, in which:

FIG. 3 shows a configuration of an individual tooth, FIG. 3.1 shows the formation of a widened tooth portion in the rear part of the individual tooth, FIG. 3.2 shows a tooth reduction carried out on both sides of an individual tooth and FIG. 3.3 shows an increased tooth reduction by forming an indentation in the front region of the individual tooth.

DETAILED DESCRIPTION

Figure 1:
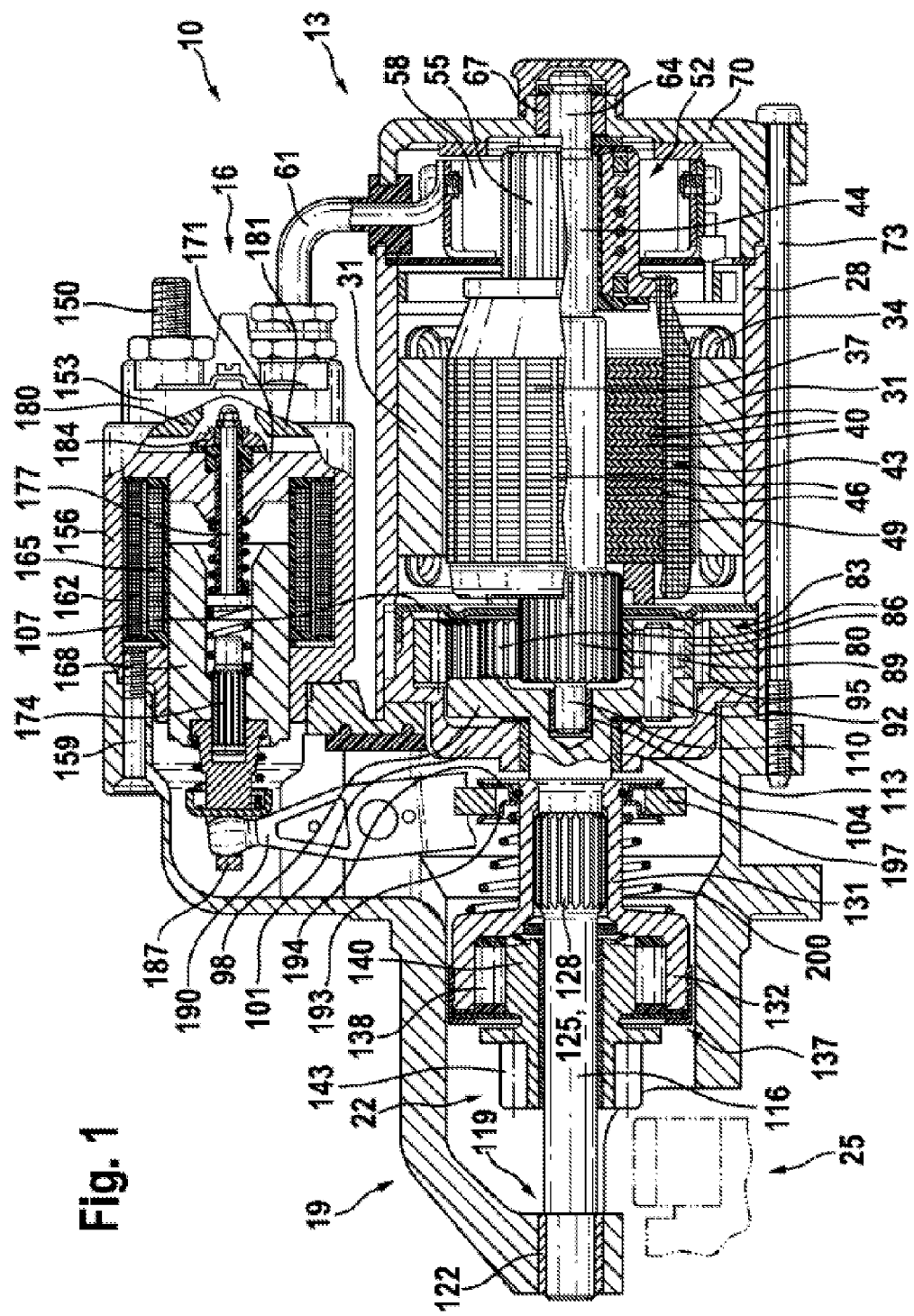
FIG. 1 shows a starter device in a longitudinal section.

FIG. 1 shows a starter device 10 in a longitudinal section.

The starter device 10 has, for example, a starter motor 13 and a toe-in actuator 16, such as for example a relay or a starter relay. The starter motor 13 and the electrical toe-in actuator 16 are fastened to a common drive bearing shield 19. The starter motor 13 serves, in terms of function, to drive a starter pinion 22 when it is meshed in the ring gear 25 of the internal combustion engine, not shown in FIG. 1.

The starter motor 13 has, as a housing, a pole tube 28 which on its inner circumference bears pole shoes 31 around which one respective excitation winding 34 is wound. The pole shoes 31 in turn surround an armature 37 which comprises an armature assembly 43 constructed from plates 40 and an armature winding 49 arranged in grooves 46. The armature assembly 43 is pressed onto a drive shaft 44. Moreover, a commutator 52 which amongst other things is constructed from individual commutator bars 55 is attached to the end of the drive shaft 13 remote from the starter pinion 22. The individual commutator bars 55 are electrically connected to the armature winding 49, in a known manner, such that when current is applied to the commutator bars 55 by carbon brushes 58 a rotational movement of the armature 37 occurs in the pole tube 28. A power supply 61 arranged between the electrical drive 16 and the starter motor 13 supplies both the carbon brushes 58 and the excitation winding 34 with power in the switched-on state. The drive shaft 13 is supported on the commutator side by a shaft journal 64 in a slide bearing 67, which in turn is held fixedly in a commutator bearing cover 70. The commutator bearing cover 70, in turn, is fastened by means of tensioners 73 (screws, for example two, three or four in number) which are distributed over the circumference of the pole tube 28 in the drive bearing shield 19. In this case, the pole tube 28 is supported on the drive bearing shield 19 and the commutator bearing cover 70 on the pole tube 28.

Viewed in the drive direction, attached to the armature 37 is a sun gear 80 which is part of an epicyclic gear system, such as for example a planetary gear unit 83. The sun gear 80 is surrounded by a plurality of planet gears 86, generally three planet gears 86, which by means of roller bearings 89 are supported on axle journals 92. The planet gears 86 roll in an internal gear 95, which is mounted on the outside in the pole tube 28. In the direction of the output side, a planet carrier 98 is adjoined to the planet gears 86, the axle journals 92 being received in said planet carrier. The planet carrier 98 is, in turn, mounted in an intermediate bearing 101 and a slide bearing 104 arranged thereon. The intermediate bearing 101 is configured to be pot-shaped, such that both the planet carrier 98 and the planet gears 86 are received therein. Moreover, the internal gear 95 is arranged in the pot-shaped intermediate bearing 101, which internal gear is finally closed by a cover 107 relative to the armature 37. Also the intermediate bearing 101 is supported with its outer circumference on the inside of the pole tube 28. The armature 37 has on the end of the drive shaft 13 remote from the commutator 52 a further shaft journal 110, which is also received in a slide bearing 113. The slide bearing 113, in turn, is received in a central bore of the planet carrier 98. The planet carrier 98 is integrally connected to the output shaft 116. The output shaft 116 is supported with its end 119 remote from the intermediate bearing 101 in a further bearing 122 which is fastened in the drive bearing shield 19.

The output shaft 116 is divided into different portions: thus following the portion which is arranged in the slide bearing 104 of the intermediate bearing 101 is a portion with straight toothing 125 (internal toothing) which is part of a shaft-hub connection. The shaft-hub connection 128 permits the axially linear sliding of a drive element 131. The drive element 131 is a sleeve-like extension which is integrally connected to a pot-shaped external ring 132 of the free-wheel 137. The free-wheel 137 (directional locking mechanism) comprises, moreover, the inner ring 140 which is arranged radially inside the outer ring 132. Clamping bodies 138 are arranged between the inner ring 140 and the outer ring 132. The clamping bodies 138 in cooperation with the inner ring and the outer ring prevent a relative rotation between the outer ring and the inner ring in a second direction. In other words: the free-wheel 137 permits a relative circumferential movement between the inner ring 140 and the outer ring 132 in only one direction. In this exemplary embodiment, the inner ring 140 is integrally configured with the starter pinion 22 and the oblique toothing 143 thereof, which is configured as an external oblique toothing. The starter pinion 22 may alternatively also be configured as a straight-toothed pinion. Instead of electromagnetically excited pole shoes 31 with an excitation winding 34, poles excited by permanent magnets could also be used.

The electrical toe-in actuator 16 and/or the armature 168 also have the task of moving, by means of a pulling element 187, a lever arranged rotatably movably in the drive bearing shield 19. The lever 190, generally configured as a forked lever, encompasses with two "tines", not shown here, two disks 193 and 194 on the outer circumference thereof, in order to move a drive ring 197 clamped therebetween toward the free-wheel 137 against the resistance of the spring 200, and as a result to mesh the starter pinion 22 in the ring gear 25.

The meshing mechanism is described in more detail hereinafter. The electrical toe-in actuator 16 has a bolt 150 which constitutes an electrical contact and when installed in the vehicle is connected to the positive pole of an electrical starter battery which is not shown in the view according to FIG. 1. The bolt 150 is passed through a cover 153 of the toe-in actuator 16. A second bolt 152 is a connector for the electrical starter motor 13 which is supplied via the power supply 61 (thick flexible lead). Said cover 153 closes a housing 156 made of steel, which is fastened by means of a plurality of fastening elements 159 (such as for example screws) to the drive bearing shield 19. A thrust device 160 is located in the electrical toe-in actuator 16 to exert a tensile force on the forked lever 190 as well as a switching device 161. The thrust device 160 comprises a winding 162, and the switching device 161 comprises a winding 165. The winding 162 of the thrust device 160 and the winding 165 of the switching device 161 in each case generate in the switched-on state an electromagnetic field which flows through various components. The shaft-hub connection 128 may also be provided with toothing comprising a steep thread instead of a straight toothing 125. Combinations are possible here, according to which a) the starter pinion 22 has oblique toothing and the shaft-hub connection 128 has straight toothing 125 or b) the starter pinion 22 is configured with oblique toothing and the shaft-hub connection 128 is provided with toothing comprising a steep thread or c) the starter pinion 22 has straight toothing and the shaft-hub connection 128 is provided with toothing comprising a steep thread.

Figure 2:
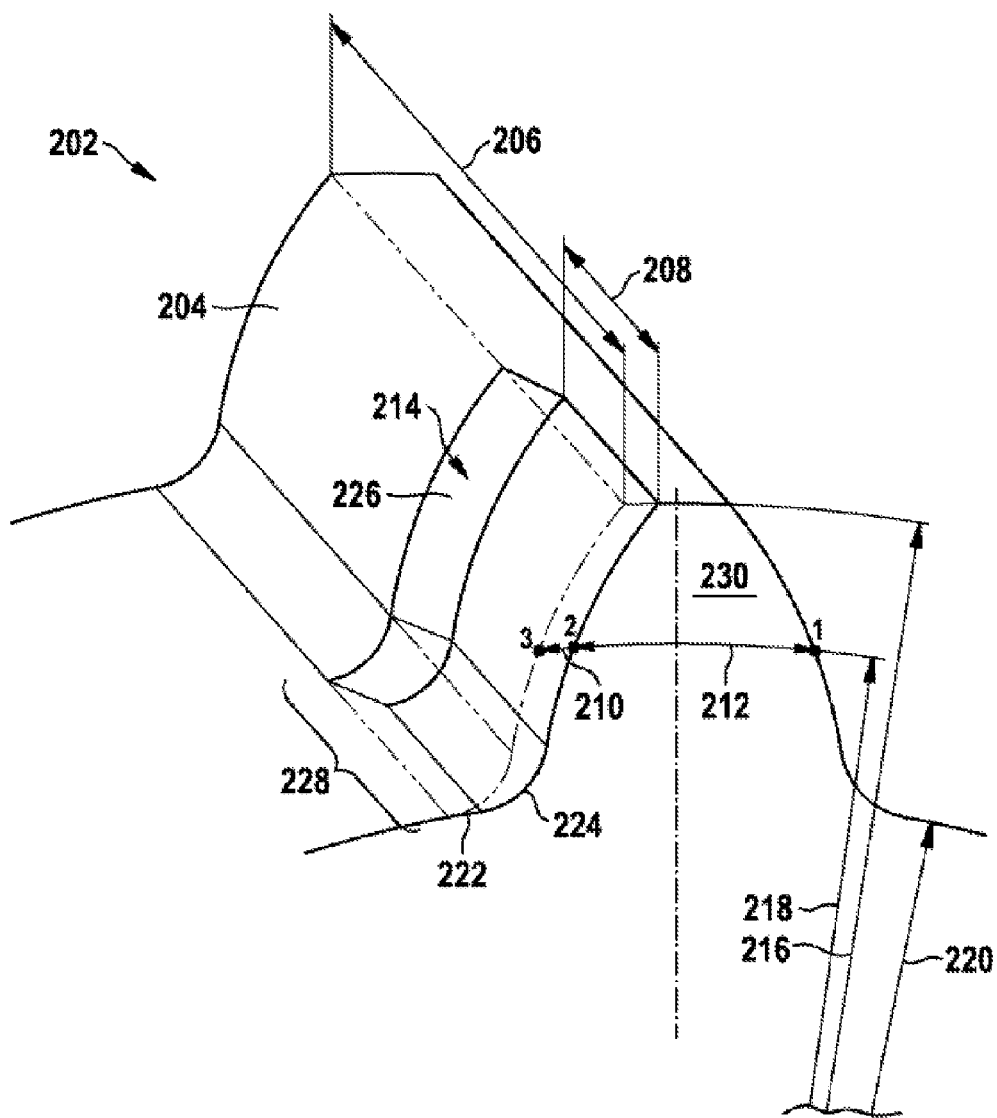
FIG. 2 shows a tooth with a asymmetrical toothing proposed according to the invention in the front region with a reduced tooth width.

With reference to a tooth of the toothing, FIG. 2 shows the asymmetrical toothing proposed according to the invention with a partially reduced tooth width in the front region of the toothing.

Pursuant to the proposed solution according to the invention, an asymmetrical toothing 214 is described hereinafter with reference to an individual tooth 202. The individual tooth 202 may be a tooth of a toothing, which may be configured as straight toothing or oblique toothing. The individual tooth 202 shown in FIG. 2 of an asymmetrical toothing 214 may either be configured on the outer toothing of a starter pinion 22 according to the view in FIG. 1 or on an outer circumference of a ring gear 25 for starting an internal combustion engine. In the individual tooth 202 shown in FIG. 2, a tooth flank 204 is formed with a tooth width 206. According to the invention, it is proposed that on the tooth flank 204, according to the view in FIG. 2, within a feed region 228, which extends from a front face 230 of the individual tooth 202, a reduced tooth thickness 212 is produced along a reduced tooth width 208. The reduced tooth thickness 212 extends from the front face 230 of the individual tooth 202 along the reduced tooth width 208 as far as a transition flank region 226. Within said transition flank region 226 on the tooth flank 204, the reduced tooth thickness 212 gradually merges with an original tooth thickness 210. This means that the asymmetrical toothing 214 is formed on the tooth flank 204.

By means of the asymmetrical toothing 214, the in the meshing of the individual teeth 202 of the starter pinion 22 and the ring gear 25 of the internal combustion engine may be improved without the reliability of secure meshing of the starter pinion 22 in the outer toothing of the ring gear 25 being endangered. The asymmetrical toothing 214 proposed according to the invention is configured such that the tooth thickness 210 viewed inside the flank region 228 of the individual tooth 202—starting from the front face 230 of the starter pinion 22 or the ring gear 25—over the reduced tooth width 208 is only configured on one side of the tooth flank 204 of the individual tooth 202, so that a reduced tooth thickness 212 is present inside said flank region 228 a tooth flank 204 of the individual tooth 202. Along this flank region 228, characterized by the reduced tooth thickness 212 and by the reduced tooth width 208, a desired torsional flank clearance of, for example, 0.3 mm is produced. This has the effect that the toothing is configured over the remaining part of the tooth width 206—minus the reduced tooth width 208—with a markedly reduced torsional flank clearance which is less than 0.3 mm. By combining both measures, i.e. the configuration of the asymmetrical toothing 214 in the flank region 228 of the individual tooth 208 relative to the front face 230 and the reduction of the flank clearance along the tooth width 206, minus the reduced tooth width 208, firstly reliable meshing of the starter pinion 22 in the ring gear 25 is ensured and secondly the noise level of the toothing is noticeably reduced.

For the sake of completeness, it should be mentioned that, on the individual tooth 202 of the asymmetrical toothing 214, a tip circle 216 of the individual tooth 202 is identified by the reference numeral 216, a pitch circle of the individual tooth is identified by the reference numeral 218, and the root circle is identified by the reference numeral 220. A region within a tooth root 222 of the individual tooth is critical, the mechanical loading thereof when the individual teeth 202 of the asymmetrically designed toothing 214 mesh together not being allowed to be exceeded. The transition flank region is denoted by the reference numeral 226, within which the reduced tooth thickness 212 merges with the original tooth thickness 210.

In the configuration of the described asymmetrical toothing 214, it should be taken into account that the flank pressure and the stresses present in the region of the tooth root 220 are reliably maintained both in the region of reduced tooth thickness 212 and in the region which is formed with the non-reduced, i.e. the original, tooth thickness 210. The following method steps are therefore specified for the configuration of the asymmetrical toothing 214 proposed according to the invention:

When configuring an asymmetrical toothing 214 which is optimized in terms of noise and configured, for example, as straight toothing, the reduction of the torsional flank clearance of the tooth flanks 204 of the individual teeth 202 is desired. At the same time, for reliably ensuring the secure meshing of the starter pinion 22 in the toothing of the ring gear 25 a torsional flank clearance of at least 0.3 mm is to be maintained. In order to control these opposing effects, the following method is proposed in the configuration of the toothing:

As a first step, an optimized toothing geometry is configured to maintain defined root stresses at the tooth root 222 and corresponding to a root rounding 224 and maintaining maximum flank stresses which may occur on the tooth flanks 204 of the individual teeth 202. In the optimized toothing geometry to be configured in the first step, the torsional flank clearance is intended to be minimized according to the bearing tolerances.

In a further, second configuration step, from the optimized toothing geometry derived in the first step, a toothing geometry is derived where a reduced tooth width 208 and the necessary torsional flank clearance of at least 0.3 mm are obtained. In this case, the same radius may be used on the tooth root 222 as in the optimized toothing geometry obtained according to the first method step. Based on the original tooth width 206, the reduced tooth width 208 may be implemented by setting a smaller profile modification factor, for example when manufacturing the starter pinion 22. A transverse diameter of the tip circle 216 of the individual tooth 202 of the asymmetrical toothing 214 does not have to be altered in this case.

In a third method step serving for evaluation, if it proves that the toothing geometry at the tooth root 222 is at least the same as that of the reference toothing, then the optimized toothing geometry determined in the first method step is permitted.

In the third method step carrying out an evaluation, if it is ensured that the toothing geometry at the tooth root 222 according to the present configuration step is at least the same as the reference toothing, then the optimized toothing geometry determined in the first method step may be permitted. If, however, this is to be avoided, a modular increase in the configuration of the toothing should be undertaken in the optimized toothing determined and configured in the first method step, and the two subsequent method steps, i.e. the second and third method steps, repeated.

In the views according to FIGS. 3, 3.1, 3.2 and 3.3, various embodiments of individual tooth geometries are shown. An embodiment according to the prior art may be derived from the view according to FIG. 3, according to which an individual tooth 202 comprises a tooth root 222 having the root circle 220. The driving flank of the individual tooth 202 is denoted by the reference numeral 204. The tooth thickness is identified by the reference numeral 210. A front face of the individual tooth 202 shown in a perspective plan view in FIG. 3 is identified by the reference numeral 230. It may be derived from the view according to FIG. 3.1 that the individual tooth 202 shown there has a wider tooth thickness 240, which exceeds the tooth thickness 210 of the individual tooth 202. The "normal" tooth thickness is identified in the variant according to FIG. 3.1 by the reference numeral 210. The variant shown in FIG. 3.1, moreover, has an indentation 238 on the individual tooth 202, which is configured in this variant on the flank of the individual tooth 202 remote from the driving tooth flank 204. The position 230 in this variant of an individual tooth 202 also denotes the front face of the starter pinion 22 or the front face of a ring gear 25, the toothing thereof comprising individual teeth 202 which, according to the solution proposed according to the invention, have an asymmetrical toothing.

A further embodiment of the asymmetrical toothing may be derived from the view according to FIG. 3.2, in which a tooth reduction 232 is carried out on both sides in the upper region of the individual tooth, preferably in the region between the tip circle 216 and the pitch circle 218. As a result of the tooth reduction 232 on both sides, compared with the views according to FIGS. 3 and 3.1, the tooth width 210 is reduced further in the region of the tip circle 216 of the individual tooth 202 according to the variant in FIG. 3.2. Also in this variant, the indentation 238 is formed in the region of the front face 230, the termination of said indentation being provided by the tooth root 222. According to the variant 3.2, the tooth width in the region of the tip circle 216 is less than the tooth thickness 210 and, when the tooth reduction 232 is formed on both sides, even less than the first, already reduced tooth thickness 212.

FIG. 3.3, finally, shows a further embodiment of the asymmetrical toothing proposed according to the invention. As is revealed from the perspective view according to FIG. 3.3, in this embodiment a considerable tooth reduction 234 is carried out, in particular a tooth reduction 234 on one side on the trailing tooth flank of the individual tooth 202 opposing the driving flank 204. Said tooth reduction 234 is indicated in the view according to FIG. 3.3 by the dashed line. The position 236 denotes a second tooth thickness 236 which is further reduced relative to the first reduced tooth thickness 212. In the front region, i.e. in the region of the front face 230 of the individual tooth 202 according to the view in FIG. 3.3, similarly to the variants shown above, according to FIGS. 3.1 and 3.2 the indentation 238 is configured on the trailing tooth flank, opposing the driving tooth flank 204.

The indentation 238 which is configured to be set back, according to the views in FIGS. 3.1, 3.2 and 3.3, simplifies the meshing process, in particular, when the circumferential speed of the ring gear 25 on the engine side is greater than that of the starter pinion 22 on the starter side. This may in particular bring about advantages for the meshing of a starter pinion 22 in an internal combustion engine which is decelerating.

What is claimed is:

1. A toothing for a gear, wherein the toothing comprises individual teeth (202) spaced circumferentially from one another around an axis of rotation of the gear, each tooth (202) extending radially from the axis of rotation, characterized in that each tooth (202) includes a front face (230) and a rear face disposed opposite the front face (230), the rear face spaced from the front face (230) by a tooth width (206) that extends along a direction parallel to the axis of rotation, wherein each tooth (202) further includes a first tooth thickness (212) at the front face (230) and a second tooth thickness (210) at the rear face, the first and second tooth thicknesses (212, 210) each extending along a pitch circle (218) of the gear, wherein the first tooth thickness (212) is smaller than the second tooth thickness (210), and wherein the first tooth thickness (212) transitions into the second tooth thickness (210) in a transition region (226) disposed between the front face (230) and the rear face.

2. The toothing as claimed in claim 1, characterized in that each tooth (202) includes a flank region (228) having the first tooth thickness (212), the flank region (228) extending from the front face (230) to the transition region (226), wherein the toothing is disposed on a starter pinion (22) that is meshed with a ring gear (25) of an internal combustion engine, and wherein a torsional flank clearance in the flank region (228) is greater than 0.3 mm, the torsional flank clearance being a clearance measured between the starter pinion and the ring gear.

3. The toothing as claimed in claim 2, characterized in that the torsional flank clearance outside the flank region (228) is less than 0.3 mm.

4. The toothing as claimed in claim 1, characterized in that the transition region (226) extends over an entire height of the tooth (202), the height measured along a radius of the gear between a tooth root circle (220) and a tip circle (216).

5. The toothing as claimed in claim 1, characterized in that each tooth (202) includes a set-back indentation (238) which merges with the front face (230).

6. A method for configuring a toothing as claimed in claim 2 comprising the following method steps:
   a) configuring a toothing for reliably maintaining a geometry of at least a tooth root and flank with a torsional flank clearance of ≤0.3 mm,
   b) configuring a toothing geometry with a reduced tooth width (208) for obtaining the torsional flank clearance of 0.3 mm by maintaining the radius of the tooth root (222) according to method step a) and
   c) when obtaining a reliable geometry of the tooth root (222), which corresponds to a reliable geometry of the tooth root (222) of a toothing according to method step a), the toothing is left according to method step a).

7. The method as claimed in claim 6, characterized in that, according to method step b), the reduction of a tooth width (206) is undertaken by selecting a smaller profile modification factor on the starter pinion (22), and a diameter of a tip circle (216) of the toothing remains unaltered.

8. The method as claimed in claim 6, characterized in that when the reliable geometry of the tooth root (222) is not obtained, according to method step c) and according to method step a), a modular increase is undertaken and the method steps b) and c) are carried out again.

9. The toothing as claimed in claim 1, wherein the first tooth thickness is constant along a flank region (228) that extends from the front face (230) to the transition region (226) along the direction parallel to the axis of rotation.

10. The toothing as claimed in claim 9, wherein the second tooth thickness is constant along a region that extends from the transition region to the rear face along the direction parallel to the axis of rotation.

11. The toothing as claimed in claim 1, characterized in that each tooth (202) includes a flank region (228) having the first tooth thickness, the flank region (228) extending from the front face (230) to the transition region (226), wherein the toothing is disposed on a ring gear (25) of an internal combustion engine that is meshed with a starter pinion (22), and wherein a torsional flank clearance in the flank region (228) is greater than 0.3 mm, the torsional flank clearance being a clearance measured between the starter pinion and the ring gear.

12. The toothing as claimed in claim 11, wherein the torsional flank clearance outside the flank region (228) is less than 0.3 mm.

13. A method for configuring a toothing as claimed in claim 11 comprising the following method steps:
   a) configuring a toothing for reliably maintaining a geometry of at least a tooth root and flank with a torsional flank clearance of ≤0.3 mm,
   b) configuring a toothing geometry with a reduced tooth width (208) for obtaining the torsional flank clearance of 0.3 mm by maintaining the radius of the tooth root (222) according to method step a) and
   c) when obtaining a reliable geometry of the tooth root (222), which corresponds to a reliable geometry of the tooth root (222) of a toothing according to method step a), the toothing is left according to method step a).

14. The method as claimed in claim 13, characterized in that, according to method step b), the reduction of a tooth width (206) is undertaken by selecting a smaller profile modification factor on the ring gear (25), and a diameter of a tip circle (216) of the toothing remains unaltered.

15. The method as claimed in claim 13, characterized in that when the reliable geometry of the tooth root (222) is not obtained, according to method step c) and according to method step a), a modular increase is undertaken and the method steps b) and c) are carried out again.

16. The toothing as claimed in claim 1, wherein the tooth (202) includes a flank, wherein the flank includes a first outer surface along a portion of the tooth (202) having the first tooth thickness (212), a second outer surface along a portion of the tooth (202) having the second tooth thickness (210), and the transition region (226), wherein the first outer surface is parallel to the second outer surface, and wherein the transition region (226) defines a ramped surface extending between the first and second outer surfaces.

17. A toothing for a gear, wherein the toothing comprises individual teeth (202) spaced circumferentially from one another around an axis of rotation of the gear, each tooth (202) extending radially from the axis of rotation, characterized in that each tooth (202) includes a front face (230) and a rear face disposed opposite the front face (230), the rear face spaced from the front face (230) by a tooth width (206) that extends along a direction parallel to the axis of rotation, wherein each tooth (202) further includes a set-back indentation (238) which merges with the front face (230), wherein the indentation (238) is on a non-driving tooth flank of the tooth, wherein the indention (238) terminates at a tooth root (222), and wherein the indentation (238) includes a surface recessed axially from the front face (230) and disposed at an oblique angle relative to the front face (230).

18. The toothing as claimed in claim 17, wherein each tooth (202) includes a flank region (228) having the indentation (238), wherein the toothing is disposed on a starter pinion (22) that is meshed with a ring gear (25) of an internal combustion engine, and wherein a torsional flank clearance in the flank region (228) is greater than 0.3 mm, the torsional flank clearance being a clearance measured between the starter pinion and the ring gear.

19. The toothing as claimed in claim 18, characterized in that the torsional flank clearance outside the flank region (228) is less than 0.3 mm.

20. A method for configuring a toothing as claimed in claim 18 comprising the following method steps:
   a) configuring a toothing for reliably maintaining a geometry of at least a tooth root and flank with a torsional flank clearance of ≤0.3 mm,
   b) configuring a toothing geometry with a reduced tooth width (208) for obtaining the torsional flank clearance of 0.3 mm by maintaining the radius of the tooth root (222) according to method step a) and
   c) when obtaining a reliable geometry of the tooth root (222), which corresponds to a reliable geometry of the tooth root (222) of a toothing according to method step a), the toothing is left according to method step a).

21. The method as claimed in claim 20, characterized in that, according to method step b), the reduction of a tooth width (206) is undertaken by selecting a smaller profile modification factor on the starter pinion (22), and a diameter of a tip circle (216) of the toothing remains unaltered.

22. The method as claimed in claim 20, characterized in that when the reliable geometry of the tooth root (222) is not obtained, according to method step c) and according to method step a), a modular increase is undertaken and the method steps b) and c) are carried out again.

23. The toothing as claimed in claim 17, characterized in that each tooth (202) includes a flank region (228) having the indentation (238), wherein the toothing is disposed on a ring gear (25) of an internal combustion engine that is meshed with a starter pinion (22), and wherein a torsional flank clearance in the flank region (228) is greater than 0.3 mm, the torsional flank clearance being a clearance measured between the starter pinion and the ring gear.

24. The toothing as claimed in claim 23, wherein the torsional flank clearance outside the flank region (228) is less than 0.3 mm.

25. A method for configuring a toothing as claimed in claim 23 comprising the following method steps:
   a) configuring a toothing for reliably maintaining a geometry of at least a tooth root and flank with a torsional flank clearance of ≤0.3 mm,
   b) configuring a toothing geometry with a reduced tooth width (208) for obtaining the torsional flank clearance of 0.3 mm by maintaining the radius of the tooth root (222) according to method step a) and
   c) when obtaining a reliable geometry of the tooth root (222), which corresponds to a reliable geometry of the tooth root (222) of a toothing according to method step a), the toothing is left according to method step a).

26. The method as claimed in claim 25, characterized in that, according to method step b), the reduction of a tooth width (206) is undertaken by selecting a smaller profile modification factor on the ring gear (25), and a diameter of a tip circle (216) of the toothing remains unaltered.

27. The method as claimed in claim 25, characterized in that when the reliable geometry of the tooth root (222) is not obtained, according to method step c) and according to method step a), a modular increase is undertaken and the method steps b) and c) are carried out again.

* * * * *